United States Patent [19]
Greene, VII

[11] Patent Number: 5,727,204
[45] Date of Patent: Mar. 10, 1998

[54] DATABASE ORGANIZATION FOR RAPID MULTI-SET MEMBERSHIP DETERMINATION

[75] Inventor: Lynn McNulty Greene, VII, Brea, Calif.

[73] Assignee: Hughes Electronics, Los Angeles, Calif.

[21] Appl. No.: 474,422

[22] Filed: Jun. 7, 1995

[51] Int. Cl.⁶ .................................................. G06F 17/30
[52] U.S. Cl. ................................................. 395/613; 395/614
[58] Field of Search .................................... 395/600, 613, 395/615, 614

[56] References Cited

U.S. PATENT DOCUMENTS

| | | | |
|---|---|---|---|
| 5,212,788 | 5/1993 | Lomet et al. | 395/600 |
| 5,253,361 | 10/1993 | Thurman et al. | 395/600 |
| 5,361,202 | 11/1994 | Doue | 364/413.01 |
| 5,428,774 | 6/1995 | Takahashi et al. | 395/600 |
| 5,440,730 | 8/1995 | Elmasri et al. | 395/600 |
| 5,452,446 | 9/1995 | Jaohson | 395/600 |
| 5,499,360 | 3/1996 | Barbara et al. | 395/600 |
| 5,550,965 | 8/1996 | Gabbe et al. | 395/154 |

*Primary Examiner*—Wayne Amsbury
*Attorney, Agent, or Firm*—Leonard A. Alkov; Wanda K. Denson-Low

[57] ABSTRACT

A method to organize, store and retrieve information in a database to facilitate rapid object identification. An interval set is defined as an interval on a number line. The database is built from a list of interval sets as input sets. The method organizes the interval sets such that a binary search may be used to quickly locate all interval sets of which a value is a member, i.e., given a value, all sets that contain the element value are quickly identified. The solution sets are pre-stored or sorted on-the-fly into bins. Bins are created by superimposing all interval set boundaries onto one number line. Two successive boundaries on the number line constitute a bin. All sets which share the interval expressed by a bin are named within a bin. A binary search technique is used to search the bins, given a value, to locate an output set of the intervals which share the value. The method can be nested to accommodate any number of parameters, and can be modified to balance memory versus CPU resource utilization.

6 Claims, 7 Drawing Sheets

DATABASE ORGANIZATION FOR RAPID MULTI-SET MEMBERSHIP DETERMINATION

TECHNICAL FIELD OF THE INVENTION

This invention relates to computers, and more particularly to a method and system to organize, store and retrieve information in a computer database to facilitate rapid object identification based on measured characteristics.

BACKGROUND OF THE INVENTION

Analytically, given a real number value, and a number of sets, where each set is defined as an interval on the real number line, the invention quickly determines all sets of which the value is a member. A set corresponds to the range of values that a characteristic of a particular object may take on. The invention solves an historically time consuming database search problem involving multi-set membership determination. One class of applications involving such a problem is that of electronic warfare applications, where rapid action is paramount; objects must be identified as friend or foe immediately.

Prior techniques for solving this database search problem are either (a) exhaustive, executed at a rate $O(2n)$, i.e., the database search was conducted from first to last record, testing both boundaries per record, or (b) a two-pass intersection, executed at a rate $O(n)$, i.e., the set of all records satisfying one boundary would be predetermined, and the members of that set would be tested against the second boundary.

SUMMARY OF THE INVENTION

The invention provides a method which solves this search problem and executes at a best rate of $O(\log(\text{base } 2\ n))$. The invention is generally applicable to set membership database query problems which use one or more parameter values as keys in a database search for objects. By using a method in accordance with the invention, reaction times of systems which must base their response on object identification (e.g., friend or foe and type) can be much reduced. From another perspective, systems which require rapid identification can be built more affordably using this invention, in that a less powerful central processing unit (CPU) may be used. The method trades computer memory to gain execution speed.

The method in a general sense comprises the following steps:

organizing data representing an object attribute characteristic as a plurality of interval sets on a number line representing the range of possible characteristic values, wherein each interval set is defined by a lower interval boundary and an upper interval boundary;

storing date in a database representing a set of bins, wherein the bins represent a set of interval sets which share a bin interval between two boundaries on the number line; and given an input characteristic value, determining which interval sets include the input value by searching the bins.

In one exemplary embodiment, the bin intervals are between two successive interval set boundaries on the number line. The step of determining which interval sets include the input value includes performing a binary search of the bins.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

This invention is a method to organize, store, and retrieve information in a database to facilitate rapid object identification based on measured characteristics. Regardless of whether the generic characteristics of objects are known from prior experience, or are learned on-the-fly, object descriptors can be organized in groups based on shared characteristics. Proper grouping of the objects in memory facilitates rapid identification given one or more object attribute measurements. This rapid identification of objects is critical in applications, such as electronic warfare, in which the appropriate assets must be activated in real time to be effective.

An algorithm embodying this invention minimizes the time to identify objects. In accordance with the invention, data is organized in computer memory in such a manner that, when accessed, a set containing one or more parametrically matching objects is found in a minimal number of clock cycles.

An interval set is herein defined as an interval on a number line. The database is built from a list of interval sets. Interval sets may intersect. In accordance with the invention, the algorithm organizes interval sets such that a binary search may be used to quickly locate all interval sets of which a value is a member. That is, given a value, all sets that contain the element are quickly identified. The solution sets are pre-stored or sorted on-the-fly into bins. An important aspect of the invention is how a bin is defined. In a first embodiment, the bins have a minimum size, and are created by superimposing all interval set boundaries onto one number line; two successive boundaries on that number line constitute a bin. All sets which share the interval expressed by a bin are named within a bin. The technique may be nested to accommodate any number of parameters. Available memory is the limiting factor.

Figures 1, 2:
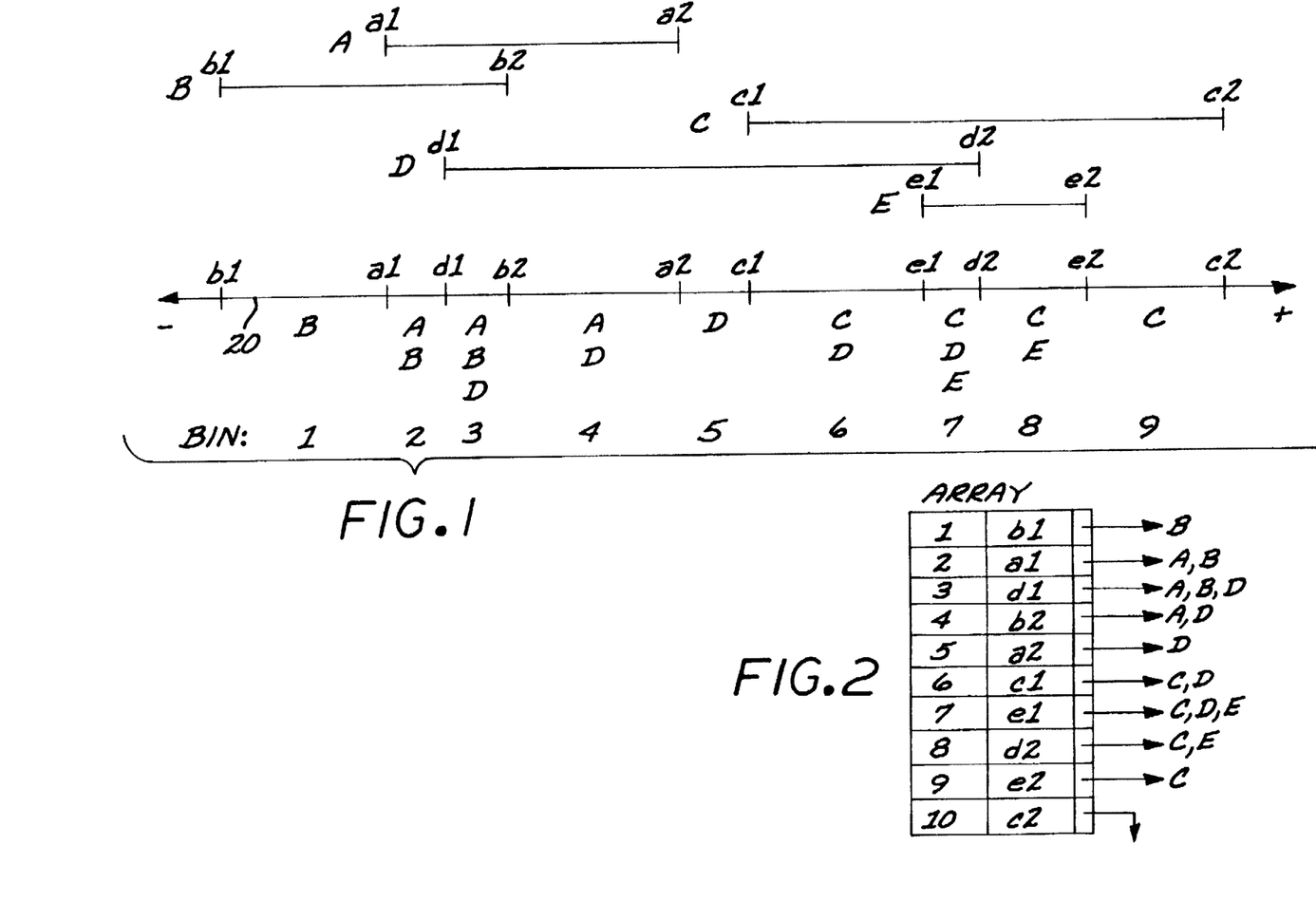
FIG. 1 illustrates the manner in which the interval sets are organized into bins in accordance with one aspect of the invention.
FIG. 2 illustrates an array of the bins and corresponding output sets.

Consider the example shown in FIGS. 1 and 2. This example has the input set S of interval sets A–E:

$$S = \{A, B, C, D, E\}$$
$$= \{(a1, a2), (b1, b2), (c1, c2), (d1, d2), (e1, e2)\}$$

This input set of interval sets is illustrated in FIG. 1 above the number line 20. In accordance with the invention, this input set S is organized into an output set S' of bins:

$$S' = \{\text{Bin 1, Bin 2, Bin 3, Bin 4, Bin 5, Bin 6,}$$
$$\text{Bin 7, Bin 8, Bin 9}\}$$
$$= \{(B), (A,B), (A, B, D), (A, D), (D), (C, D),$$
$$(C, D, E), (C, E), (C)\}$$

The output set S' of bins is illustrated in FIG. 2 below the number line 20.

Boundaries are stored in order in an array such that a binary search may be used to quickly yield a match set for an input value. FIG. 2 illustrates the array for the set boundaries and bins shown in the number line example of FIG. 1. The array lists the bin number, the beginning boundary for that bin and the input sets which share the interval expressed by the bin. Thus, Bin 1 starts with boundary b1 and ends with boundary a1; only input set B shares this interval. Bin 2 starts with a1 and ends with d1; inputs sets A and B share this interval. Bin 3 starts, with d1 and ends with b2; input sets A, B and D share this interval. Bin 4 starts with b2 and ends with a2; input sets A and D share this interval. Bin 5 is the interval between a2 and c1; input set D shares this interval. Bin 6 is the interval between c1 and e1; input sets C and D share this interval. Bin 7 is the interval between e1 and d2; input sets C, D and E share this interval. Bin 8 is the interval between d2 and e2; input sets C and E share this interval. Bin 9 is the interval between e2 and c2; input set C shares this interval. Bin 10 commences with c2 and has no upper limit in this example; no input sets are in this bin.

Consider the following example. For input value v, where $e1 \leq v < d2$, the match set is M=C,D,E). The match set can be found using a binary search technique, such as the following. Since there are 10 bins, start with Bin 5. Since v is greater than a2, the start boundary of this bin, search a bin midway between Bin 5 and Bin 10, say Bin 8. Since v is less than d2 of Bin 8, search a bin midway between Bin 5 and Bin 8, say Bin 6. Since v is greater than c1 of Bin 6, Bin 7 is next inspected and found to match. The worst case access time is, in "big-O" notation well known in the field of computer science, $O(\log_2(2*\text{number\_of\_sets\_in\_S}))$.

Figure 3:
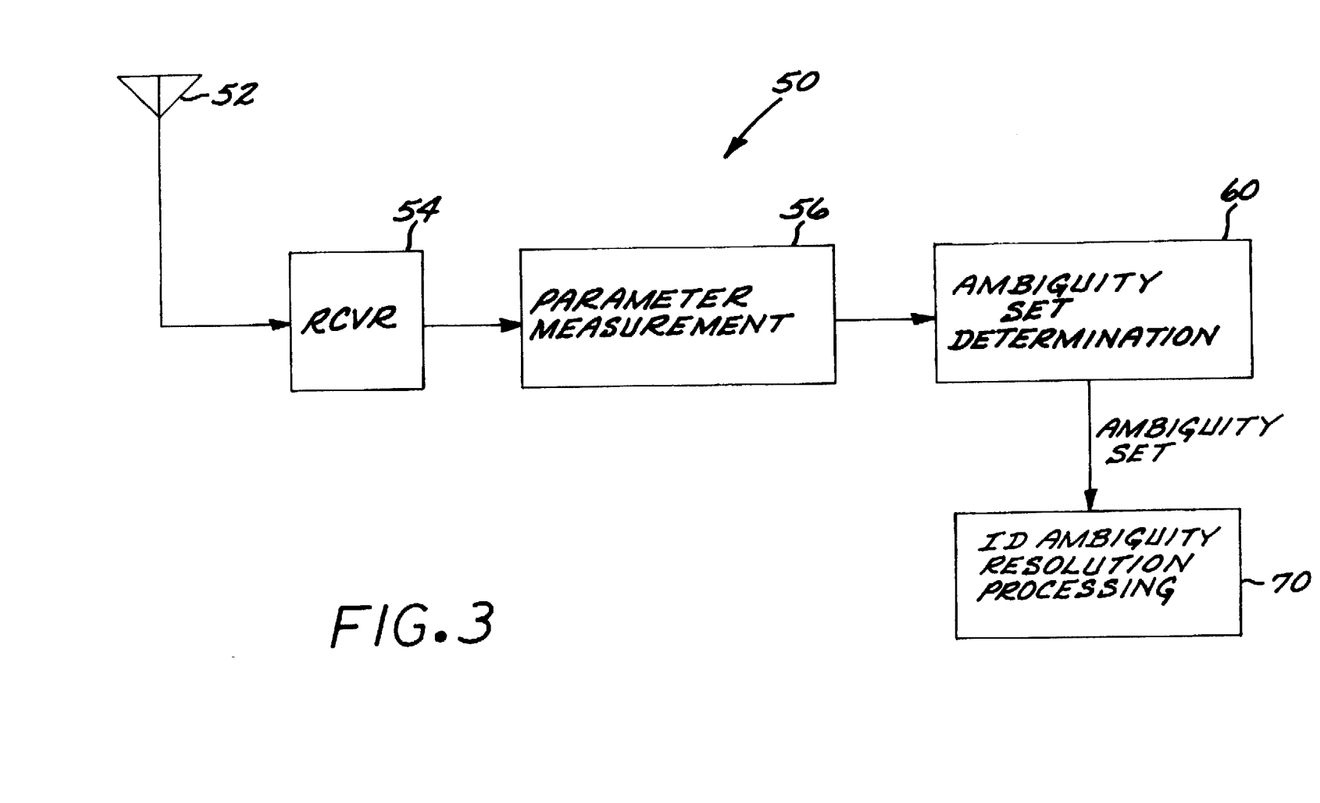
FIG. 3 is a general block diagram of an electronic warfare system embodying an ambiguity set determination function in accordance with this invention.

An exemplary application for this invention is in electronic warfare systems. FIG. 3 shows a simplified block diagram of an electronic warfare system 50, which includes an antenna 52 for receiving electromagnetic signals. The antenna signals are processed through a receiver 54, and passed to a parameter measurement function 56. This function provides the measurement of various parameters of a received signal, such as, by way of example only, the frequency of the received signal. The results of the parameter measurement are then passed to the ambiguity set determination function 60. The output of the function 60 is passed to further ambiguity resolution processing at function 70.

Figure 4:
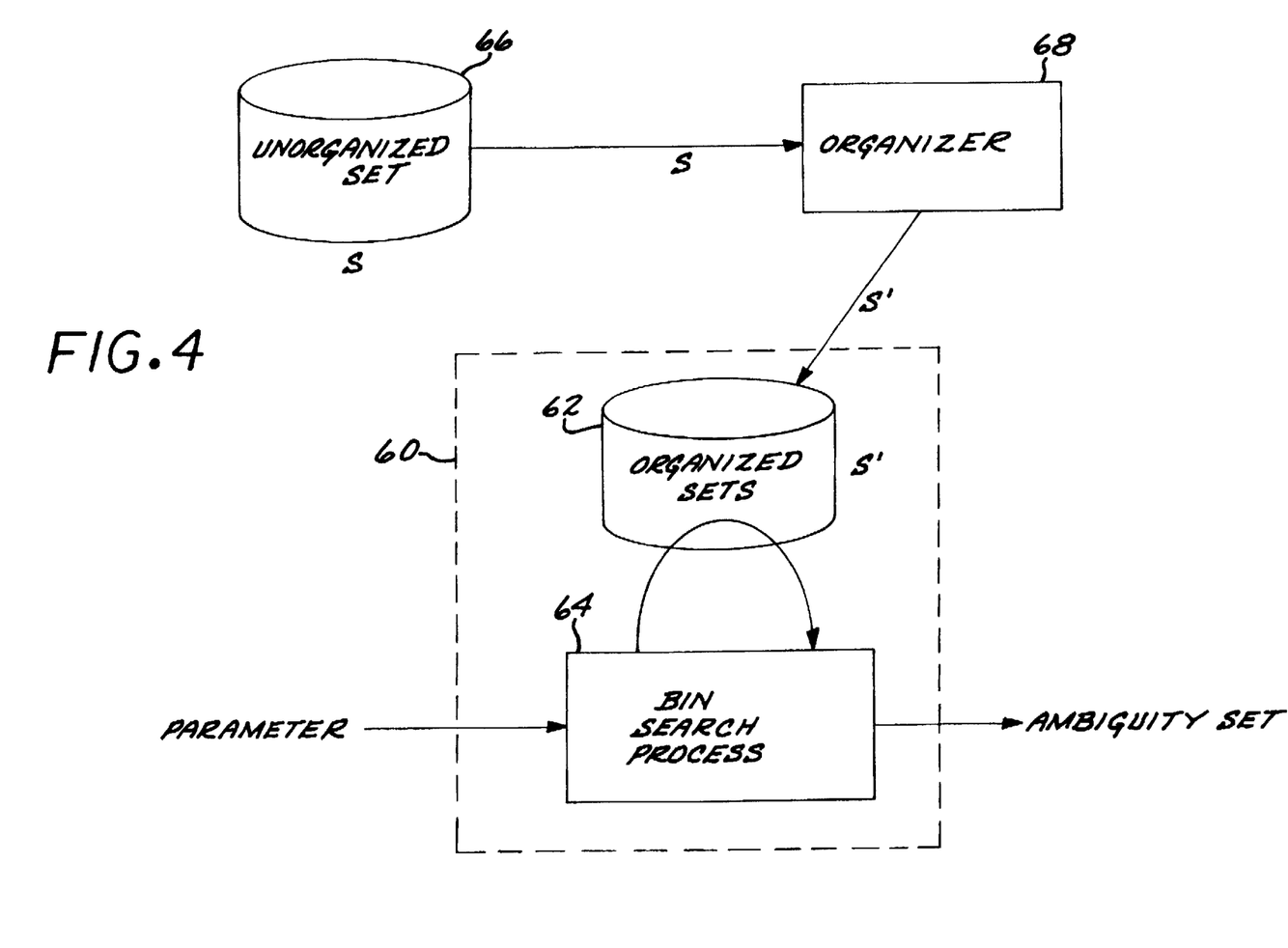
FIG. 4 is a block diagram further illustrating the ambiguity set determination function of the system of FIG. 3.
Figure 5:
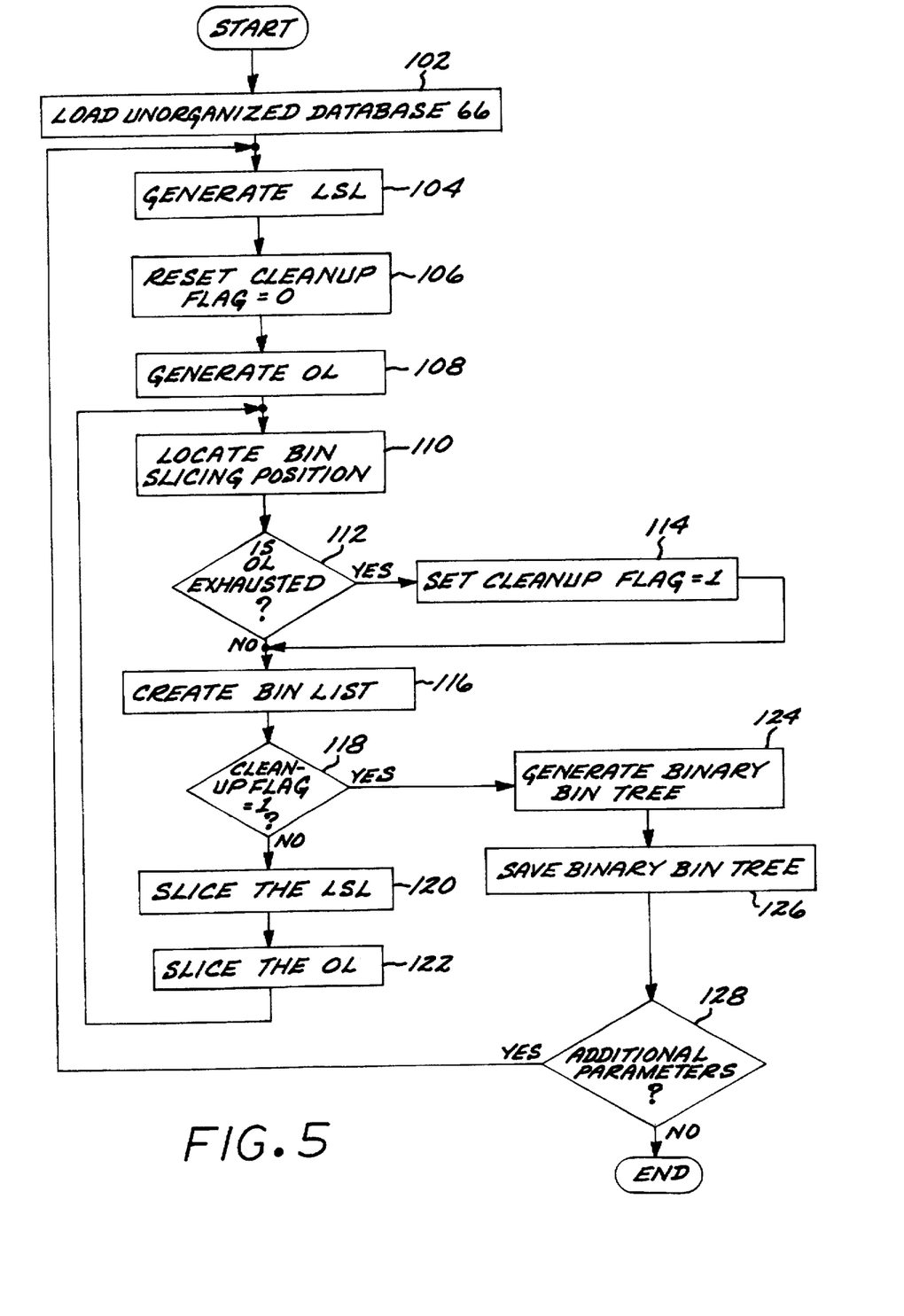
FIG. 5 is a flow diagram illustrating an alternate method of database organization in accordance with the invention.

The function 60 uses the measured parameter to isolate a set of objects which share this measured parameter. For example, the measured frequency of the signal can be used to determine a possible set of objects known to share the measured frequency. This is diagrammatically shown in FIG. 4. Here, the unorganized input sets S (identified as block 66) have been organized into the corresponding output sets S' representing the bins by organizer 68. (The organized output sets S' are shown as block 62.) The measured parameter value from the parameter measurement function 56 of FIG. 3 is input to the function 60, and a bin search process 64 is performed, using the measured parameter value. The resulting ambiguity set of interval sets is then provided to the ambiguity resolution processing function 70 (FIG. 3).

The embodiment illustrated in FIGS. 1 and 2 employs bins of the minimum bin size, i.e., wherein the bins each extend only from one interval set boundary on the number line to the next boundary. This "minimum bin size" embodiment results in obtaining the solution set in the minimum number of clock cycles, but also is relatively memory intensive. For some embodiments, the memory requirements may outstrip the hardware capabilities. Thus, in an alternate embodiment of the invention, the bin size may be selected to be variable, spanning more than the number space between adjacent boundaries. Such larger bins, also described herein as "super bins," require less memory to store the database, at the expense of CPU processing speed since additional searching will be required to obtain the same solution set as can be obtained using minimum size bins.

FIGS. 5–8 illustrate an alternate embodiment of the invention employing non-minimum bin sizes. This embodiment is directed to an exemplary electronic warfare application, on a system as generally shown in FIG. 3, but is generally applicable to database searching. An exemplary method 100 embodying this alternate embodiment is illustrated in the flow diagram of FIG. 5 and includes the following steps.

1. Load the database into an array (Step 102). The database (DB) 66 consists of non-redundant emitter parameter records. A record may, for example, be defined to include 1) DB code, 2) frequency upper and lower bounds, 3) pulse repetition interval (PRI) upper and lower bounds, and 4) pulse duration (PD) upper and lower bounds. Table I shows an exemplary DB including one parameter. While the example illustrated includes a unique integer ID code (E) per record, note that in the general case, the same ID code may be associated with different interval definitions.

TABLE I

| REPL Parameter Records Array | | | |
|---|---|---|---|
| I | E | L | U |
| 1 | 10 | 71.4 | 99 |
| 2 | 2 | 45.1 | 64.4 |
| 3 | 19 | 23.2 | 30.4 |
| 4 | 8 | 72.4 | 94.1 |
| 5 | 18 | 83.1 | 96.5 |
| 6 | 4 | 78.2 | 78.2 |
| 7 | 20 | 80.5 | 82.1 |
| 8 | 17 | 12.2 | 46 |
| 9 | 3 | 90.5 | 95.8 |
| 10 | 7 | 69.5 | 83.9 |
| 11 | 13 | 77 | 77.7 |
| 12 | 1 | 58.9 | 70.5 |
| 13 | 15 | 72.8 | 80.4 |
| 14 | 9 | 1.2 | 6.1 |
| 15 | 5 | 2.1 | 88.7 |
| 16 | 16 | 73.5 | 74.1 |
| 17 | 11 | 99 | 99.4 |
| 18 | 14 | 78.4 | 89.1 |
| 19 | 6 | 88.2 | 95.4 |
| 20 | 12 | 3.8 | 24 |

2. Generate the LSL linked list (Step 104). A linked list is built: from the DB of Table I with respect to a parameter (e.g., frequency) for which a fast search structure is to be generated. The list, called the Lower Sorted List (LSL), consists of elements including three fields: 1) the lower parameter bound field (L), 2) the upper parameter bound field (U), and 3) the array record index field (I). The LSL is built so as to be sorted in increasing order of boundary. The head element of the list contains the lowest lower bound. An exemplary LSL is shown in Table II.

TABLE II

Lower sorted List (LSL)

| I1 | L | U | I |
|----|------|------|----|
| 1  | 1.2  | 6.1  | 14 |
| 2  | 2.1  | 88.7 | 15 |
| 3  | 3.8  | 24   | 20 |
| 4  | 12.2 | 46   | 8  |
| 5  | 23.2 | 30.4 | 3  |
| 6  | 45.1 | 64.4 | 2  |
| 7  | 58.9 | 70.5 | 12 |
| 8  | 69.5 | 83.9 | 10 |
| 9  | 71.4 | 99   | 1  |
| 10 | 72.4 | 94.1 | 4  |
| 11 | 72.8 | 80.4 | 13 |
| 12 | 73.5 | 74.1 | 16 |
| 13 | 77   | 77.7 | 11 |
| 14 | 78.2 | 78.2 | 6  |
| 15 | 78.4 | 89.1 | 18 |
| 16 | 80.5 | 82.1 | 7  |
| 17 | 83.1 | 96.5 | 5  |
| 18 | 88.2 | 95.4 | 19 |
| 19 | 90.5 | 95.8 | 9  |
| 20 | 99   | 99.4 | 17 |

3. Set the cleanup flag=0 (Step 106).

4. Generate the OL linked list (Step 108). This linked list, called the overlap list (OL), consists of elements including three fields: 1) the boundary field (B), 2) the transition field (T), and 3) the overlap count field (C). Table III sets out an exemplary OL. The OL is built so as to be sorted in increasing order of lower bound. The head element of the list contains the lowest boundary. The OL is generated in two passes:

Pass One. The first pass works through the LSL, allocating elements for each lower and upper boundary and sorting them by boundary value into the OL. During the first pass, the OL transition (T) field is initialized to a 1 if the boundary is a lower boundary, and −1 if the boundary is an upper boundary.

When a boundary to be sorted into the OL is found to already exist in the OL (i.e., the boundary serves more than one interval), then a new OL element is not created, but rather the existing element T field is incremented if the boundary to be sorted in is a lower boundary, and is decremented if the boundary to be sorted in is an upper boundary. The boundary that was to be sorted in is discarded.

Pass Two. The second pass serves to generate the overlap count C. The first OL element's overlap count is set to that element's transition count. The overlap count of all subsequent OL elements is set to the sum of that element's transition count and the previous element's overlap count.

TABLE III

Overlap List (OL)

| I2 | B | T | C |
|----|------|----|---|
| 1  | 1.2  | 1  | 1 |
| 2  | 2.1  | 1  | 2 |
| 3  | 3.8  | 1  | 3 |

TABLE III-continued

Overlap List (OL)

| I2 | B | T | C |
|----|------|----|---|
| 4  | 6.1  | −1 | 2 |
| 5  | 12.2 | 1  | 3 |
| 6  | 23.2 | 1  | 4 |
| 7  | 24   | −1 | 3 |
| 8  | 30.4 | −1 | 2 |
| 9  | 45.1 | 1  | 3 |
| 10 | 46   | −1 | 2 |
| 11 | 58.9 | 1  | 3 |
| 12 | 64.4 | −1 | 2 |
| 13 | 69.5 | 1  | 3 |
| 14 | 70.5 | −1 | 2 |
| 15 | 71.4 | 1  | 3 |
| 16 | 72.4 | 1  | 4 |
| 17 | 72.8 | 1  | 5 |
| 18 | 73.5 | 1  | 6 |
| 19 | 74.1 | −1 | 5 |
| 20 | 77   | 1  | 6 |
| 21 | 77.7 | −1 | 5 |
| 22 | 78.2 | 0  | 5 |
| 23 | 78.4 | 1  | 6 |
| 24 | 80.4 | −1 | 5 |
| 25 | 80.5 | 1  | 6 |
| 26 | 82.1 | −1 | 5 |
| 27 | 83.1 | 1  | 6 |
| 28 | 83.9 | −1 | 5 |
| 29 | 88.2 | 1  | 6 |
| 30 | 88.7 | −1 | 5 |
| 31 | 89.1 | −1 | 4 |
| 32 | 90.5 | 1  | 5 |
| 33 | 94.1 | −1 | 4 |
| 34 | 95.4 | −1 | 3 |
| 35 | 95.8 | −1 | 2 |
| 36 | 96.5 | −1 | 1 |
| 37 | 99   | 0  | 1 |
| 38 | 99.4 | −1 | 0 |

5. Locate the bin slicing position using the OL (Step 110). The OL is used to determine the best bin slicing point between boundaries. The best slicing point is is found via serial search. The best slicing point defined as that value which corresponds to a minimum overlap count C (note: selecting the minimum overlap count minimizes the number of intervals that must be sliced through.) The operator specifies the search window via the bounds B_min and B_max which dictate an average super bin size minimum and maximum (i.e., number of bins per super-bin). These values represent bounds on the number of positive transitions (T) counted though inspection of OL elements as elements are traversed from the beginning of the OL. In this exemplary embodiment, B_min is set to 8, and B_max is set to 16.

Table IV illustrates the search for minimum C, which begins at the element at which B_min-R transitions have been counted, and ends at the element at which B_max-R transitions have been counted. R, which represents the remainder number of intervals carried forward from the last slicing process, is initialized to zero when the LSL is created. If there is more than one minimum C element found, then the minimum C element closest or equal to the B_max-R element is considered the best. The slicing position value is calculated as the mid point lower bound value between the minimum C element boundary and the boundary of the next element in the list. In the example of Table IV, the winning slicing position is calculated to be 70.95, and is rounded to 71.

TABLE IV

Sort For minimum overlap count closest to B_max

| I3 | B | T | C | |
|---|---|---|---|---|
| 8  | 30.4 | −1 | 2 | B_min |
| 10 | 46   | −1 | 2 | |
| 12 | 64.4 | −1 | 2 | |
| 14 | 70.5 | −1 | 2 | The Winner |
| 9  | 45.1 | 1  | 3 | |
| 11 | 58.9 | 1  | 3 | |
| 13 | 69.5 | 1  | 3 | |
| 15 | 71.4 | 1  | 3 | |
| 16 | 72.4 | 1  | 4 | B_max |
|    | (70.5 + 71.4)/2 = |  |  | 71 |
|    | Slice position value |  |  | |

6. Set the cleanup flag=1 if the OL is exhausted (Steps 112 and 114). If the OL is exhausted before the (B_max-R)$^{th}$ element is found, then no slicing is necessary and a cleanup flag is set.

7. Create the bin list (Step 116). The LSL is traversed until the first element with a lower bound greater than the slicing position value is found or until the end of the list is found. Identify this element to become the new head element of the LSL when slicing is completed. A new linked list, sorted by decreasing upper bound, is generated, called the bin; an exemplary first bin is shown in Table V. The bin list includes a special head node which contains a field reflecting the slicing value. The elements of the bin list are generated 1-to-1 from the string of elements of the LSL to be sliced out (all elements, from the first to that preceding the new head element will eventually be removed from the LSL). Each bin element includes one field. Into the field is copied the index value from the corresponding LSL element. Note that the upper bound of the LSL is used to sort the new elements into the bin. The completed bin list is added to the linked list of bins.

TABLE V

Sort For minimum overlap count closest to B_max

| I4 | L | U | I |
|---|---|---|---|
| 1  | 1.2  | 6.1  | 14 |
| 2  | 2.1  | 88.7 | 15 |
| 3  | 3.8  | 24   | 20 |
| 4  | 12.2 | 46   | 8  |
| 5  | 23.2 | 30.4 | 3  |
| 6  | 45.1 | 64.4 | 2  |
| 7  | 58.9 | 70.5 | 12 |
| 8  | 69.5 | 83.9 | 10 |
| 1  | 71   | 88.7 | 15 |
| 2  | 71   | 83.9 | 10 |
| 3  | 71.4 | 99   | 1  |
| 4  | 72.4 | 94.1 | 4  |
| 5  | 72.8 | 80.4 | 13 |
| 6  | 73.5 | 74.1 | 16 |
| 7  | 77   | 77.7 | 11 |
| 8  | 78.2 | 78.2 | 6  |
| 9  | 78.4 | 89.1 | 18 |
| 10 | 80.5 | 82.1 | 7  |
| 11 | 83.1 | 96.5 | 5  |
| 12 | 88.2 | 95.4 | 19 |
| 13 | 90.5 | 95.8 | 9  |
| 14 | 99   | 99..4 | 17 |

8. At the decision point 118, ff the cleanup flag is set, the method branches to step 124.

Figure 6:
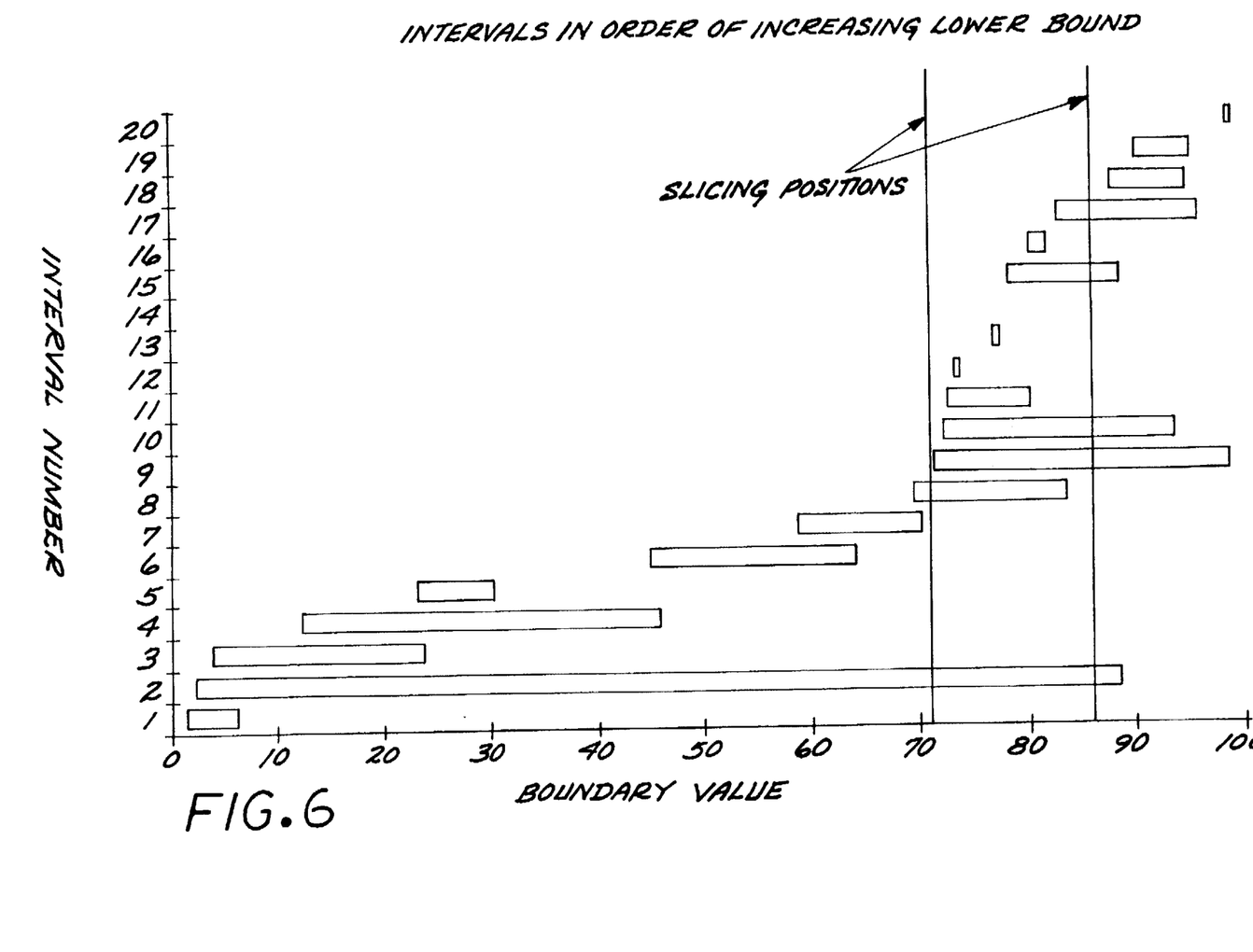
FIG. 6 is a bar chart showing the intervals and their boundary values, analogous to FIG. 1.
Figure 7:
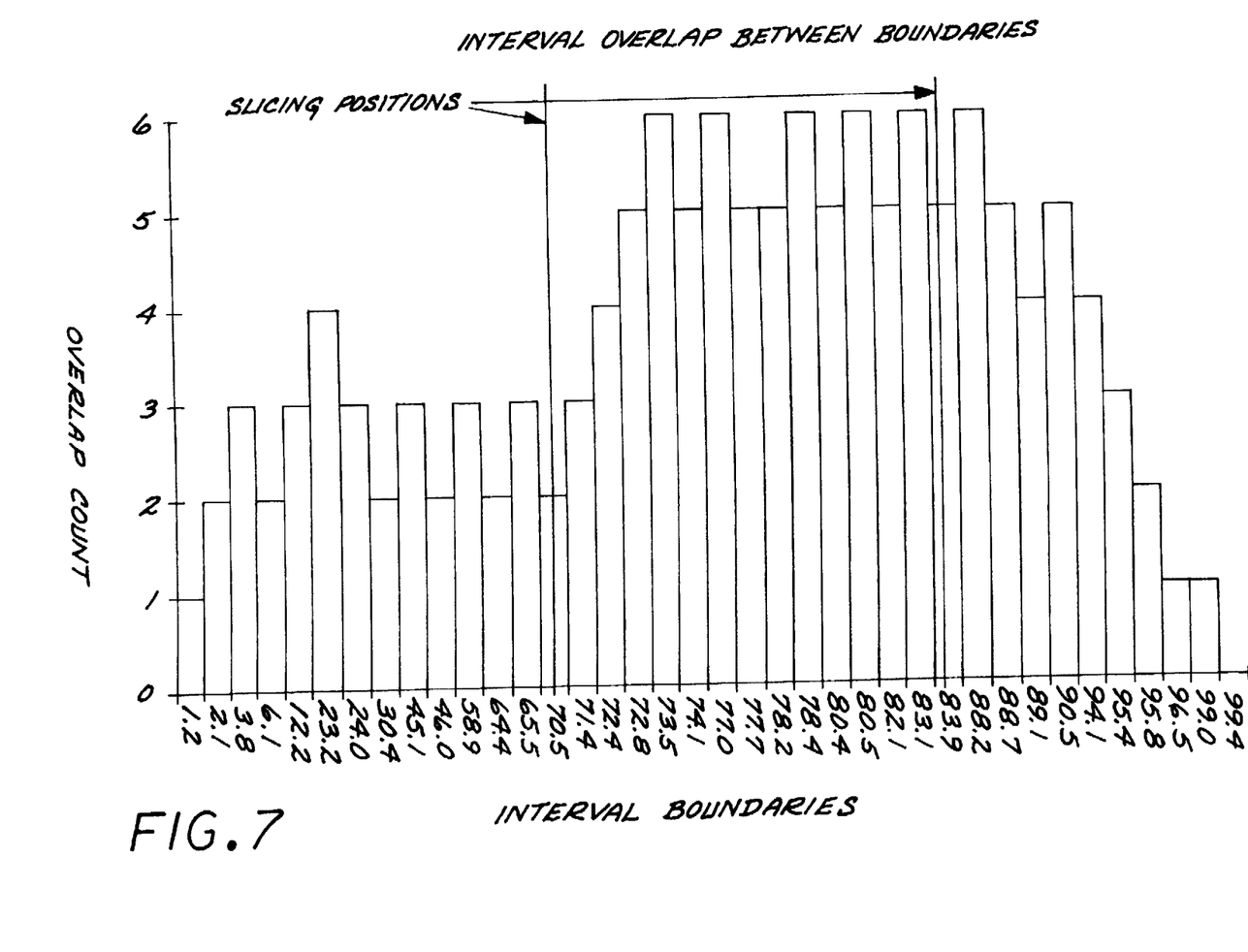
FIG. 7 is an interval overlap histogram, illustrating the bin slicing positions selected in accordance with the alternate method of FIG. 5.

9. Slice the LSL (Step 120). Search the elements of the LSL to be sliced off for all elements whose upper boundary is greater than the slicing value (i.e., the interval is sliced through). The sliced through intervals in this embodiment are shown in FIG. 6. For each sliced-through interval found, create a new LSL element using the slicing value as the new lower bound, and copy the old element upper bound (b) and index (I) into the new upper bound and index fields. Sort each new element into the LSL. Assign to R the number of new elements created. Once all sliced-through elements have been treated, discard all LSL elements preceding the newly identified first element (i.e., the new head of the list).

10. Slice the OL (Step 122). Search the OL for the first element with a lower boundary greater than the slicing value. This will be the new OL head node. Discard all nodes encountered that have a lower boundary less than the slicing value during the search. (Note: in the example, the new OL head element was an element created using the slicing value. Generation of such an element leads to no algorithmic advantage.) This step is illustrated in Table VI.

TABLE VI

New overlap List (OL)

| I5 | B | T | C |
|---|---|---|---|
| 1  | 71   | 0  | 2 |
| 2  | 71.4 | 1  | 3 |
| 3  | 72.4 | 1  | 4 |
| 4  | 72.8 | 1  | 5 |
| 5  | 73.5 | 1  | 6 |
| 6  | 74.1 | −1 | 5 |
| 7  | 77   | 1  | 6 |
| 8  | 77.7 | −1 | 5 |
| 9  | 78.2 | 0  | 5 |
| 10 | 78.4 | 1  | 6 |
| 11 | 80.4 | −1 | 5 |
| 12 | 80.5 | 1  | 6 |
| 13 | 82.1 | −1 | 5 |
| 14 | 83.1 | 1  | 6 |
| 15 | 83.9 | −1 | 5 |
| 16 | 88.2 | 1  | 6 |
| 17 | 88.7 | −1 | 5 |
| 18 | 89.1 | −1 | 4 |
| 19 | 90.5 | 1  | 5 |
| 20 | 94.1 | −1 | 4 |
| 21 | 95.4 | −1 | 3 |
| 22 | 95.8 | −1 | 2 |
| 23 | 96.5 | −1 | 1 |
| 24 | 99   | 0  | 1 |
| 25 | 99.4 | −1 | 0 |

11. Branch back to Step 110 to locate the next bin slicing position. The next bin slicing position is located using the OL and the procedure of Step 110. This step is illustrated in Table VII.

TABLE VII

Sort for minimum overlap count closest to bin_max

| I6 | B | T | C | |
|---|---|---|---|---|
| 8  | 77.7 | −1 | 5 | B_min |
| 9  | 78.2 | 0  | 5 | |
| 10 | 78.4 | 1  | 6 | |
| 11 | 80.4 | −1 | 5 | |
| 12 | 80.5 | 1  | 6 | |
| 13 | 82.1 | −1 | 5 | |
| 14 | 83.1 | 1  | 6 | |
| 15 | 83.9 | −1 | 5 | |
| 16 | 88.2 | 1  | 6 | B_max |
| 8  | 77.7 | −1 | 5 | B_min |
| 9  | 78.2 | 0  | 5 | |
| 11 | 80.4 | −1 | 5 | |

TABLE VII-continued

| Sort for minimum overlap count closest to bin_max | | | | |
|---|---|---|---|---|
| I6 | B | T | C | |
| 13 | 82.1 | −1 | 5 | |
| 15 | 83.9 | −1 | 5 | The Winner |
| 10 | 78.4 | 1 | 6 | |
| 12 | 80.5 | 1 | 6 | |
| 14 | 83.1 | 1 | 6 | |
| 16 | 88.2 | 1 | 6 | B_max |
| | (83.9 + 88.2)/2 = 86 | | | |
| | Slicing position value | | | |

12. Create Remaining Bins. The remaining bins are determined using the procedures of Step 116, and are shown in Table VIII.

TABLE VIII

| 2nd & Final Bins in Lower Sorted List (LSL) | | | |
|---|---|---|---|
| I7 | L | U | I |
| 1 | 1.2 | 6.1 | 14 |
| 2 | 2.1 | 88.7 | 15 |
| 3 | 3.8 | 24 | 20 |
| 4 | 12.2 | 46 | 8 |
| 5 | 23.2 | 30.4 | 3 |
| 6 | 45.1 | 64.4 | 2 |
| 7 | 58.9 | 70.5 | 12 |
| 8 | 69.5 | 83.9 | 10 |
| 1 | 71 | 88.7 | 15 |
| 2 | 71 | 83.9 | 10 |
| 3 | 71.4 | 99 | 1 |
| 4 | 72.4 | 94.1 | 4 |
| 5 | 72.8 | 80.4 | 13 |
| 6 | 73.5 | 74.1 | 16 |
| 7 | 77 | 77.7 | 11 |
| 8 | 78.2 | 78.2 | 6 |
| 9 | 78.4 | 89.1 | 18 |
| 10 | 80.5 | 82.1 | 7 |
| 11 | 83.1 | 96.5 | 5 |
| 1 | 86 | 88.7 | 15 |
| 2 | 86 | 89.1 | 18 |
| 3 | 86 | 94.1 | 4 |
| 4 | 86 | 96.5 | 5 |
| 5 | 86 | 99 | 1 |
| 6 | 88.2 | 95.4 | 19 |
| 7 | 90.5 | 95.8 | 9 |
| 8 | 99 | 99.4 | 17 |

Figure 8:
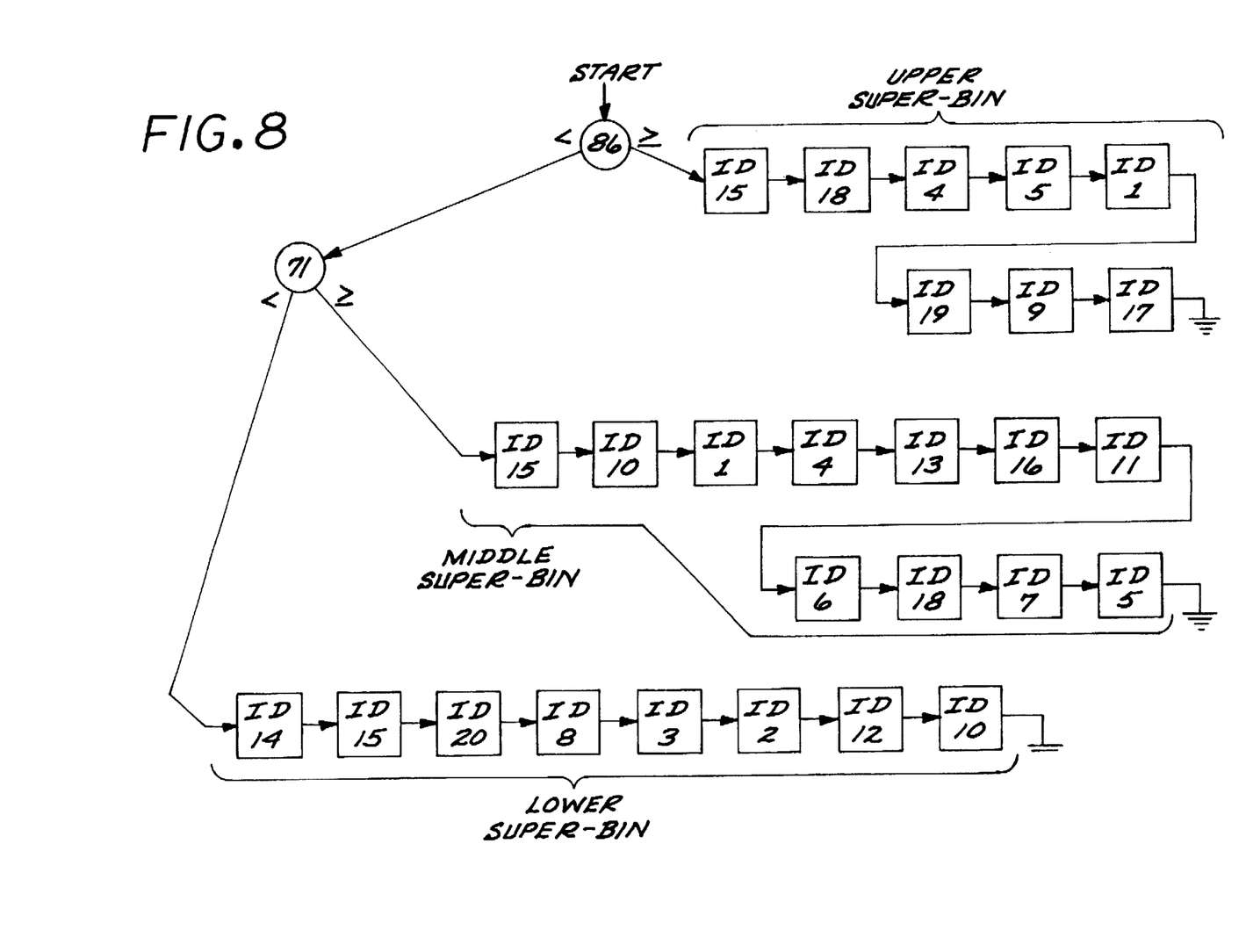
FIG. 8 illustrates a binary tree structure resulting from the database organization illustrated in FIGS. 5–7.

13. Generate the binary bin tree (Step 124). Generate a balanced binary tree of bins using the bin head node slicing point value such that a left branch leads to a bin with a slicing point value less than or equal to the test value, and a right branch leads to a bin with a slicing point value greater than the test value. An exemplary binary bin tree is shown in FIG. 8.

14. Save the binary bin tree (Step 126). Save the binary bin tree to disk as the organized database 62 for the first parameter and discard all structures except for the original unorganized database.

15. Repeat Steps 106 through 126 for each additional parameter. This step results in the generation of another binary bin tree for each additional parameter in the DB and each tree is saved for use during operation.

During operation using the organized database, e.g. during operation of the system of FIG. 3, all binary bin trees, or arrays facilitating binary bin search, are loaded into the system memory from disk. As parameters are measured, the binary bin trees are employed to rapidly provide the ID ambiguity set. For the example tree of FIG. 8, a measured parameter value from, e.g., the parameter measurement function 56 of FIG. 3, is compared to the value (86) of the tree starting head node, and if larger than or equal to this value, a serial search is made of the bins in the upper super-bin using the interval bounds stored in each bin. These bins are represented by the bin ID #s of Table VIII. These bin ID #s correspond to the record indices of the original unorganized DB, from which the object ID code (column E) can be obtained.

Referring to FIG. 8, if the measured parameter value is less than 86, then the next comparison is made to the value (71) of the lower head node separating the first two super-bins. If greater than or equal to 71, then a serial search is made of the bins stored in the middle super-bin. If less than 71, a search is made of the bins in the first super-bin.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method for rapid multi-set membership determination, comprising the following steps:

organizing data sets for a large number of objects, each data set representing an object identifier and a corresponding attribute characteristic having an upper parameter bound value and a lower parameter bound value as a plurality of interval sets, each including a lower interval parameter boundary value and an upper interval parameter boundary value, said interval sets sorted according to ascending lower interval parameter boundary value order;

storing data in a database representing a set of bins, wherein each bin represents a bin set of interval sets which share a bin parameter interval between upper and lower bin parameter bound values, and wherein the database is represented as digital data stored in a digital memory comprising a digital computer system, wherein data may be retrieved from said digital memory once per system clock cycle; and given an input characteristic value, determining which interval sets include the input value by performing a binary search of the bins, wherein the method performs said step of determining which interval sets include the input value in a minimum number of clock cycles.

2. A method for rapid multi-set membership determination, comprising the following steps:

organizing data representing an object attribute characteristic as a plurality of interval sets on a number line representing the range of possible characteristic values, wherein each interval set is defined by a lower interval boundary and an upper interval boundary;

storing data in a database representing a set of bins, wherein the bins represent a set of interval sets which share a bin interval on the number line, wherein the database is represented as digital data stored in a digital memory comprising a digital computer system, wherein data may be retrieved from said digital memory once per system clock cycle; and given an input characteristic value, determining which interval sets include the input value by binary searching the bins;

wherein the method performs said step of determining which interval sets include the input value in a minimum number of clock cycles.

3. A method for rapid multi-set membership determination using a digital computer system including a digital memory, the method comprising the following steps:

organizing data representing an object attribute characteristic as a plurality of interval sets on a number line representing the range of possible characteristic values, wherein each interval set is defined by a lower interval boundary and an upper interval boundary, each boundary representing a number value on the number line;

maintaining a set of bins in a database in said digital memory, wherein the bins represent a set of interval sets which share a bin interval on the number line, and wherein data may be retrieved from said digital memory once per system clock cycle; and given an input characteristic value on the number line, determining which interval sets include the input value by searching the bins using a binary search technique, wherein the method performs said step of determining which interval sets include the input value in a minimum number of clock cycles.

4. A method of generating a fast search database structure, comprising the following steps:

loading parameter records into a database array, wherein each record includes an object identifier and a parameter lower bound and a parameter upper bound;

using the database array records to generate an overlap list of element records, each element record including an object identifier code and a boundary field, the boundary field corresponding to one of said parameter upper and lower bounds for a given object identifier, wherein the element records are sorted in increasing order of boundary fields;

using the overlap list to generate bins of parameter records, each bin including one or more parameter records; and using the bins of parameter bins to set up a binary tree structure useful for rapidly searching said bins and parameter records to locate, from a given parameter value, sets of objects having corresponding parameter ranges in which said given value falls.

5. A method of generating a fast search database structure, comprising the following steps:

loading parameter records into a database array, wherein each record includes an object identifier and a parameter lower bound and a parameter upper bound;

using the database array records to generate an overlap list of element records, each element record including an object identifier code and a boundary field, the boundary field corresponding to one of said parameter upper and lower bounds for a given object identifier, wherein the element records are sorted in increasing order of boundary fields;

using the overlap list to generate bins of parameter records, each bin including one or more parameter records, said step of using the overlap list comprising generating bins having a preset minimum bin size B_min and a preset maximum bin size B_max, where the bin size is the number of parameter records included in the bin, and wherein the bins are separated at slicing boundaries representing parameter values selected so as to intersect a minimum number of parameter records.

6. A system for performing an object identification from a measured object parameter value, comprising:

a sensor for providing a measured parameter value, said sensor including an RF antenna for receiving electromagnetic signals, and said measured parameter value is a frequency of the received signals;

a digital memory for storing digital data;

a fast search data structure stored in said digital memory, the data structure organized from data representative of a plurality of different object data sets, each including an object identifier and corresponding predetermined object parameter interval lower and upper bound values defining a predetermined parameter value range for the object, the fast search data structure corresponding to parameter interval bins, each bin representing a list of objects whose predetermined parameter interval values overlap a bin parameter interval extending between lower and upper bin parameter bounds; and a processor for applying said measured parameter value to the fast data structure to determine a solution set of objects whose predetermined parameter value ranges share the measured parameter value.

\* \* \* \* \*